United States Patent [19]

Perkins et al.

[11] Patent Number: 5,380,036
[45] Date of Patent: Jan. 10, 1995

[54] VEHICLE REAR SUSPENSION SYSTEM

[75] Inventors: David J. Perkins, Ann Arbor; Bruce T. Siekkinen, Clarkston; Frederick J. Winsor, Birmingham, all of Mich.

[73] Assignee: Chrysler Corporation, Auburn Hills, Mich.

[21] Appl. No.: 91,849

[22] Filed: Jul. 14, 1993

[51] Int. Cl.6 .......................................... B60G 11/22
[52] U.S. Cl. ................................. 280/716; 280/772; 280/689
[58] Field of Search .................. 280/716, 772, 689

[56] References Cited

U.S. PATENT DOCUMENTS

| | | | |
|---|---|---|---|
| 1,668,295 | 5/1928 | Weinhardt | 280/716 |
| 3,332,702 | 7/1967 | Rosenkrands | 280/725 |
| 3,333,864 | 8/1967 | Allison et al. | 280/725 |
| 4,168,086 | 9/1979 | Dick et al. | 280/689 |
| 4,344,643 | 8/1982 | Ray | 280/724 |
| 4,410,201 | 10/1983 | Iijima et al. | 280/688 |
| 4,533,157 | 8/1985 | Hoenle et al. | 280/718 |
| 4,589,677 | 5/1986 | Matschinsky | 280/716 |

OTHER PUBLICATIONS

Land Rover Defender 110 brochure.
Motor Trend, Jul. 1991, "Range Rover County SE".
Land Rover; Range Rover NAS 93 onwards.
Car Design & Technology, Oct. 1992, "Suspension of Belief".

Primary Examiner—Kenneth R. Rice
Attorney, Agent, or Firm—Edward P. Barthel

[57] ABSTRACT

There is disclosed herein a vehicle rear suspension system for use with the vehicle's side rails and wheel support members secured to the ends of a tubular axle. The system includes oppositely disposed trailing arms pivotally connected at their forward ends to the respective side rails and connected by a pair of vertically oriented resilient bushings at their trailing ends to the respective wheel support members. Each bushing includes an inner metal sleeve secured to the adjacent wheel support member, an outer metal sleeve secured to the trailing arm, and a rubber ring bonded between the sleeves.

10 Claims, 5 Drawing Sheets

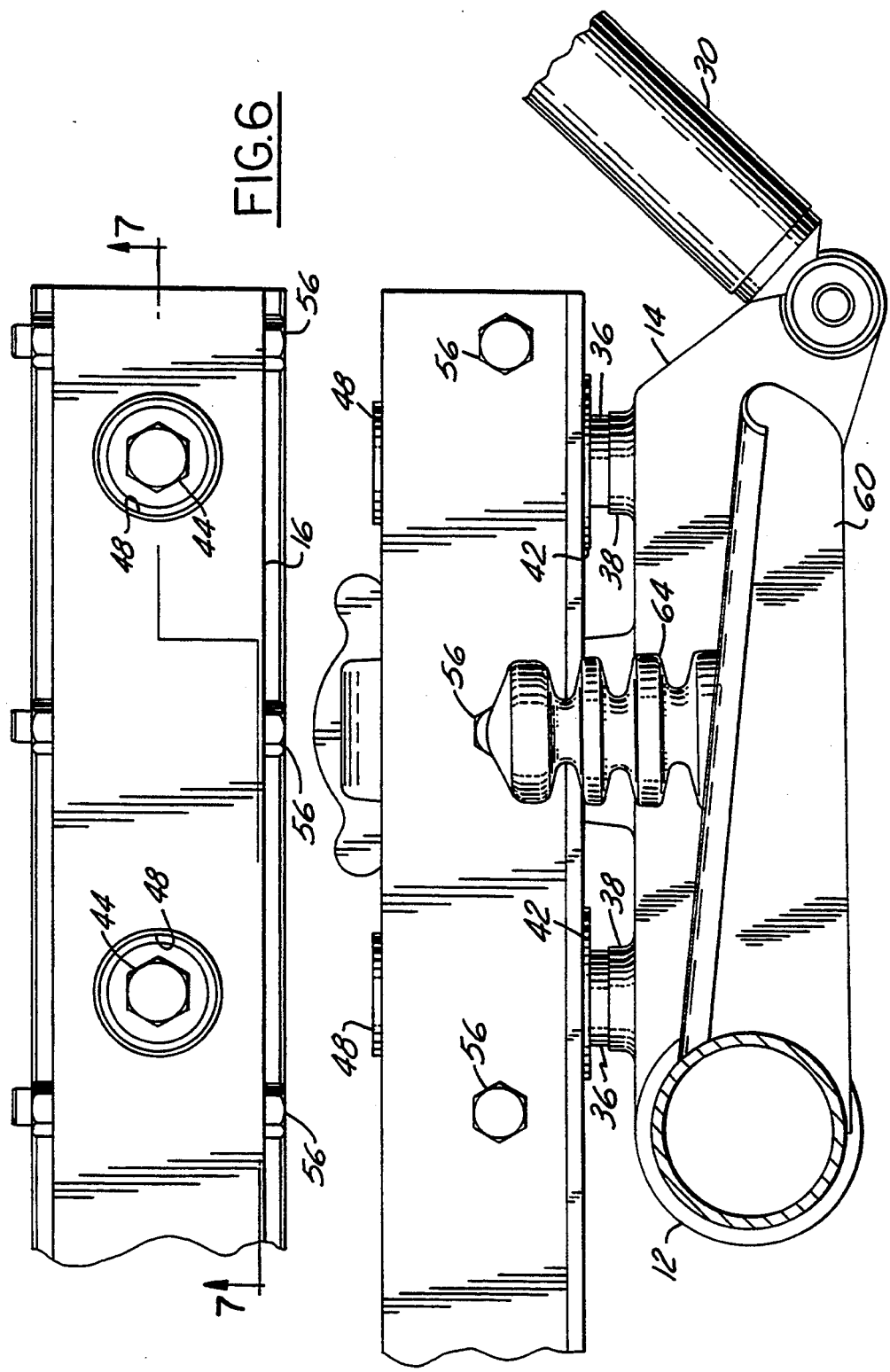

5,380,036

VEHICLE REAR SUSPENSION SYSTEM

BACKGROUND OF THE INVENTION

This invention relates generally to vehicle suspension systems and, more particularly, to rear suspension systems incorporating trailing arms therein.

TECHNICAL FIELD

Rosenkrands U.S. Pat. No. 3,332,702 discloses a roll resistant wheel suspension including V-shaped strut secured at its midpoint to an axle, and at its ends to oppositely disposed trailing arms.

Allison et al U.S. Pat. No. 3,333,864 discloses a rear suspension including a torque arm extending forwardly from an axle to a side rail, and oppositely disposed suspension arms extending rearwardly from outer ends of lateral links adjacent the axle to a torsion member extending between the side rails.

Dick et al U.S. Pat. No. 4,168,086 discloses a vehicle suspension system including oppositely disposed radius arms extending from side rails to wedge elements secured to the outer ends of axle tubes.

Ray U.S. Pat. No. 4,344,643 discloses a suspension assembly for a trailer, including oppositely disposed longitudinal members extending from a rear cross member to a forward cross member between the side rails, with V-shaped bracing elements extending from the respective longitudinal members to the axle at their apices.

Iijima et al U.S. Pat. No. 4,410,201 discloses a rear suspension including two pair of trailing links pivotally connected between a shallow U-shaped axle and the oppositely disposed side rails.

Hoenle et al U.S. Pat. No. 4,533,157 discloses a rear suspension system including a pair of leaf springs having their fore and aft ends pivotally mounted to the frame and flexibly supporting a tubular axle member forwardly and downwardly offset from the rear wheel spindles by a pair of one-piece castings, reducing the design height of the vehicle. Each casting has a jounce plate providing a stop for the side rail such that the axle and the wheel spindle shafts are caused to move in equal vertical paths between the uppermost jounce and lowermost rebound deflections.

There is known a front suspension system for use with a driven live axle (Land Rover), including oppositely disposed longitudinally oriented arms having laterally oriented resilient bushings operatively connected to the front end thereof.

DISCLOSURE OF THE INVENTION

A general object of the invention is to provide an improved vehicle rigid beam rear suspension system.

Another object of the invention is to provide a trailing arm rear suspension system, including dual bushings operatively vertically connected between each trailing arm and the axle, adapted to provide trailing arm displacement and to store energy therein to achieve desired roll stiffness while assisting the vehicle in returning to its normal position.

A further object of the invention is to provide a rear suspension system including oppositely disposed trailing arms pivotally secured at their forward ends to the side rails and resiliently connected at their trailing ends to a tubular axle via wheel support members, with dual rubber bushings on each side having vertically oriented inner metal sleeves secured to the adjacent wheel support member and vertically oriented outer metal sleeves secured to the side walls of the adjacent trailing arm, such that the intermediate bonded rubber ring is deflected therebetween to cause equal and opposite forces on the trailing arm pivot connections during vehicle roll, wherein one side of the vehicle is in jounce and the opposite side is in rebound, assisting the vehicle in returning to its normal position.

These and other object and advantages will become more apparent when reference is made to the following drawings and the accompanying description.

BRIEF DESCRIPTION OF THE DRAWINGS

FIG. 5 is a cross-sectional view taken along the plane of the line 5—5 of FIG. 1, and looking in the direction of the arrows;

FIG. 6 is a top view of a portion of the FIG. 5 structure;

BEST MODE OF CARRYING OUT THE INVENTION

Figure 1:
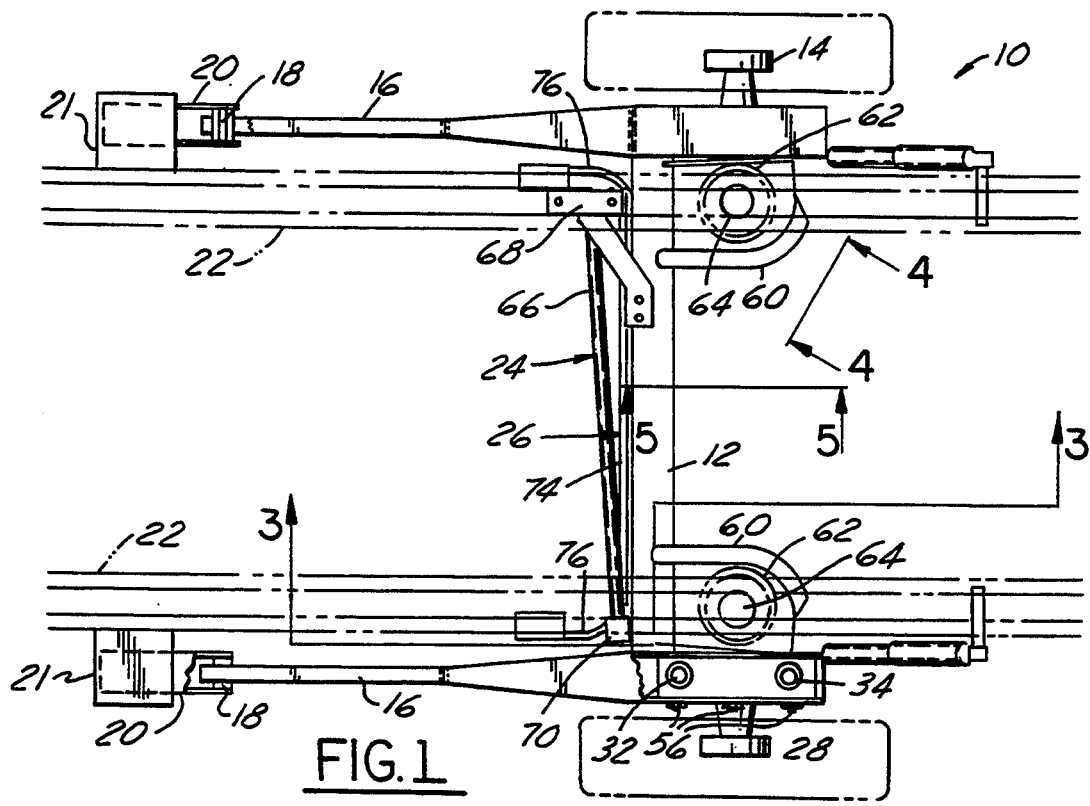
FIG. 1 is a plan view of the inventive rear suspension system.
Figure 2:
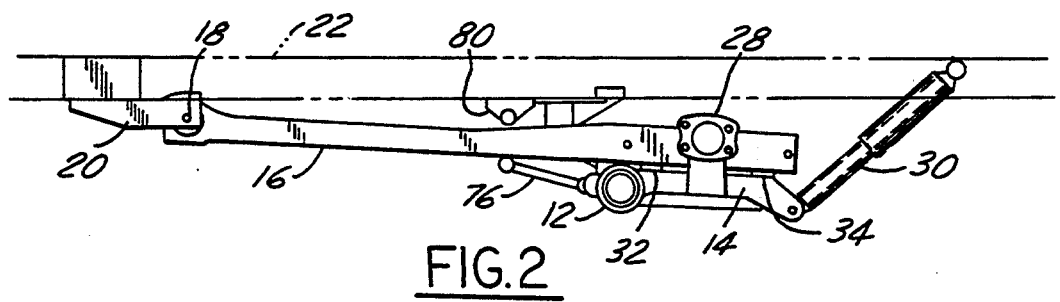
FIG. 2 is a side view of the FIG. 1 structure.
Figure 3:
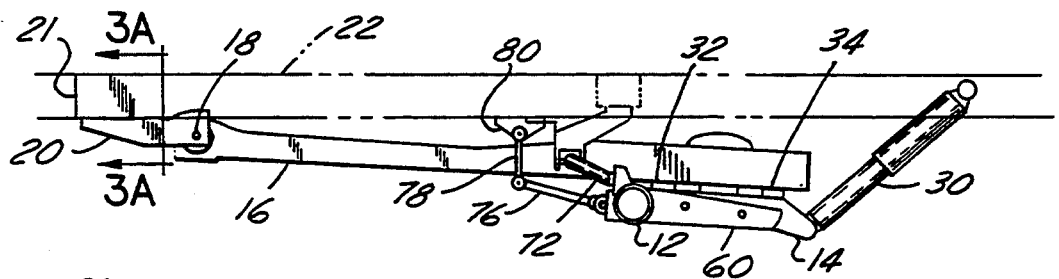
FIG. 3 is a cross-sectional view taken along the plane of the line 3—3 of FIG. 1, and looking in the direction of the arrows.
Figure 3A:
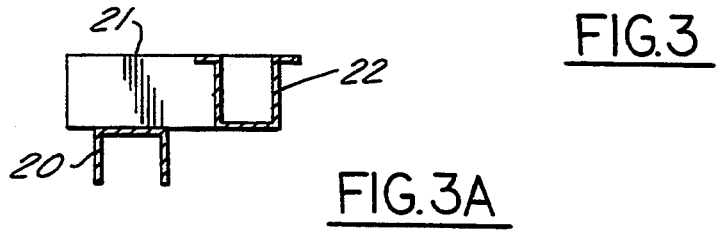
FIG. 3A is a cross-sectional view taken along the plane of the line 3A—3A of FIG. 3, and looking in the direction of the arrows.

Referring now to the drawings in greater detail, FIGS. 1–4 illustrate a vehicle rear suspension assembly 10 including generally a tubular axle 12 supporting a wheel support member 14 at each outboard end, with a trailing arm 16 flexibly connected to the tubular axle 12 and secured to each wheel support member 14. Each trailing arm 16 extends forwardly to a pivotal connection 18 on a bracket 20 secured by a suitable connector 21 to a side rail, represented at 22, serving as an anti-roll device, as will be explained. An anti-sway bar 26, which extends laterally across the vehicle in front of the tubular axle 12, may be used as an additional anti-roll device. The anti-sway bar 26 is an optional element only. A conventional track bar 24 extends laterally across the vehicle adjacent the anti-sway bar 26, serving as a lateral restraint device.

More specifically, the tubular axle 12 is rigidly attached at each end to the respective support members 14 extending rearwardly therefrom. A wheel mounting bracket 28 is integrally formed as to an intermediate portion of the support member 14. A telescoping shock absorber 30 is pivotally connected between the trailing end of the support member 14 and the side rail 22.

A pair of resilient bushings 32 and 34 are mounted on opposite sides of the wheel mounting bracket 28 between the support member 14 and the rear end portion of the trailing arm 16.

Figure 9:
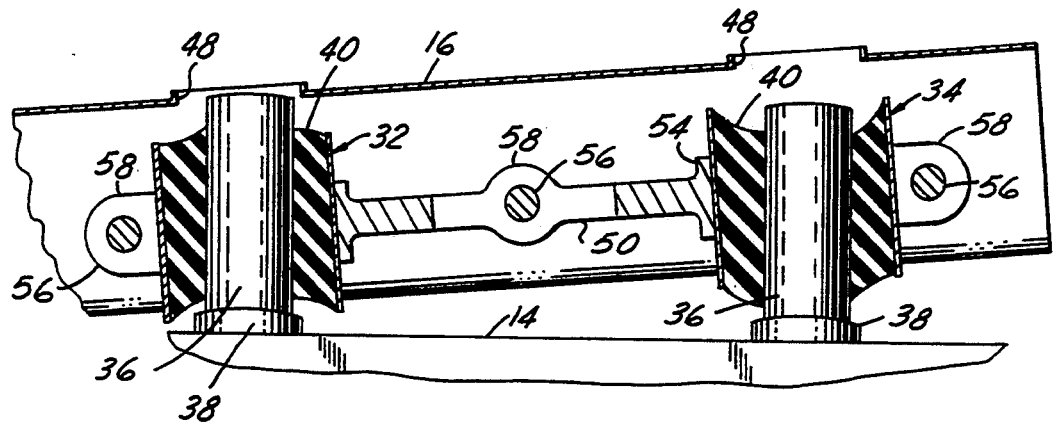
FIGS. 9 and 10 are views similar to FIG. 7, illustrating two operational conditions thereof.
Figure 8:
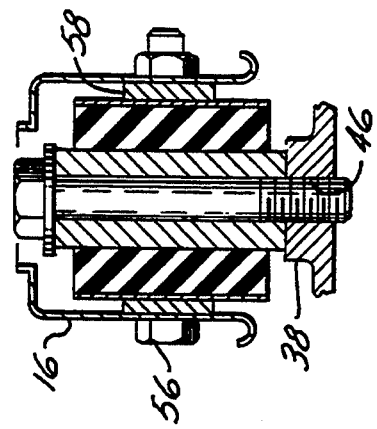
FIG. 8 is an end view of the FIG. 7 structure.
Figure 7:
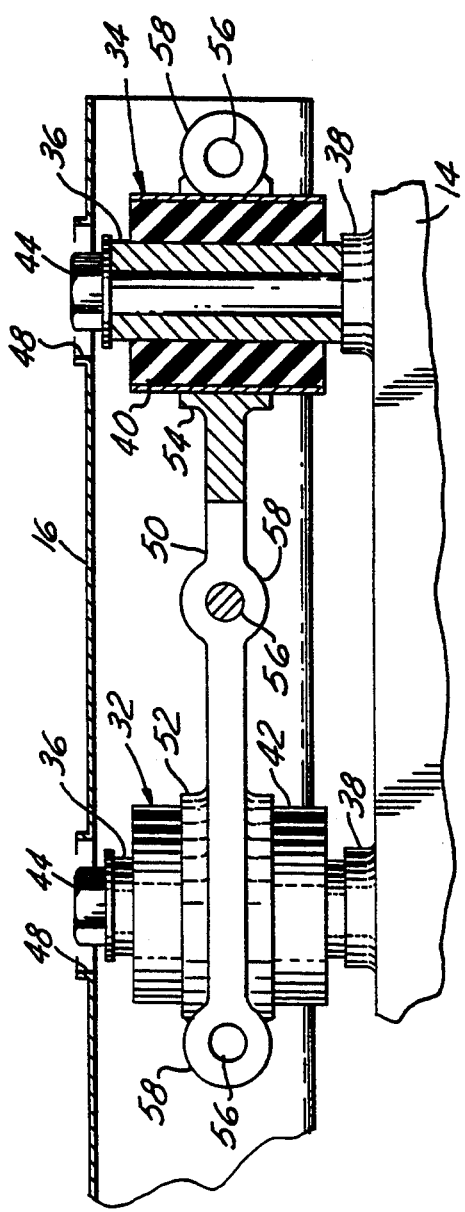
FIG. 7 is a cross-sectional view taken along the plane of the line 7—7 of FIG. 6, and looking in the direction of the arrows.

As shown in FIGS. 7-9, each bushing 32 and 34 includes an inner metal sleeve 36 vertically mounted on an embossment 38 formed on the support member 14, a rubber ring 40 bonded between the inner metal sleeve 36 and an outer metal sleeve 42. A bolt 44 extends through the inner sleeve 36 and is threadedly connected in a threaded hole 46 (FIG. 9) formed in the embossment 38 and support member 14. Each bolt 44 head extends freely into an opening 48 formed in the top wall of the trailing arm 16. A bushing support member 50 includes cylindrical ends 52 and 54 secured around the outer sleeves 42 of the respective bushings 32 and 34. A plurality of bolts 56 are mounted through respective aligned openings formed in the walls of the trailing arm 16 and through spacer extensions 58 formed in the bushing support member 50 at both ends and at the midpoint thereof with the middle bolt 56 serving as the pivot axis. In lieu of the bushing support member 50 being a cast item bolted to the trailing arm 16, a stamped extruded piece (not shown) may be welded to the sides of the trailing arm 16 and connected to the outer bushing sleeves 42.

Alternately, each inner metal sleeve 36 may be vertically secured to the upper wall of the trailing arm 16, and each outer metal sleeve 42 may be secured to the support member 14.

Figure 4:
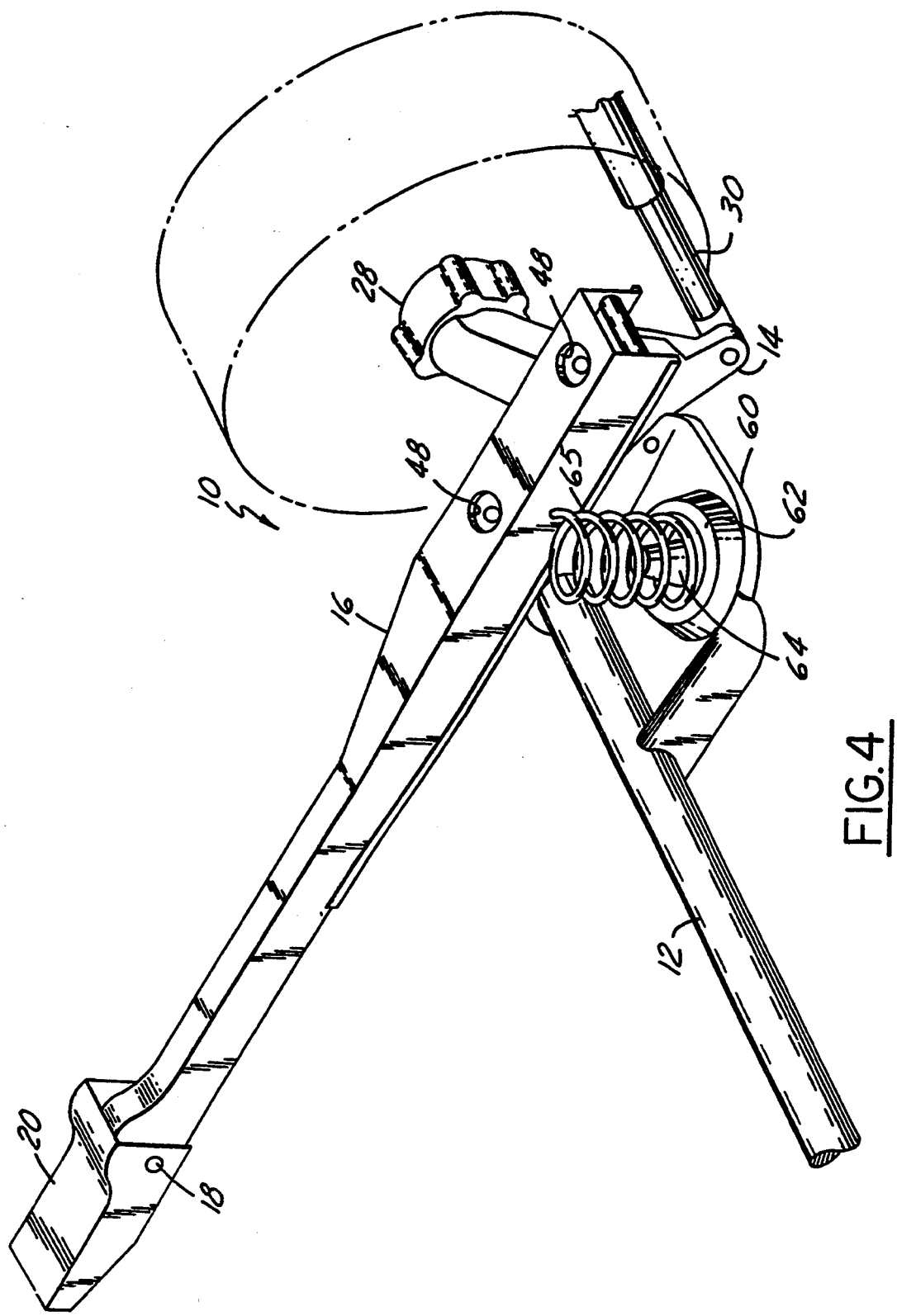
FIG. 4 is a perspective view of a portion of the FIG. 1 structure, taken along the plane of the line 4—4, and looking in the direction of the arrows.

As shown in FIGS. 1, 4 and 5, a coil spring mounting bracket 60 is secured between the tubular axle 12 and an inside wall of the wheel support member 14. A spring locator mounting base 62 and a jounce bumper 64 are provided on the top surface of the bracket 60. The base 62 may be formed integrally with the bracket 60. A coil spring 65 is mounted on the base 62 around the jounce bumper 64, and provides for road noise isolation through the use of spring isolators. An air spring load leveling system (not shown) may be used in lieu of the coil spring 65.

The track bar 24 (FIGS. 1-3) includes a main section 66 extending across the chassis at a predetermined small angle with respect to the tubular axle 12, between a bracket 68 attached to the side rail 22 at the more forward end thereof and rotatably through a sleeve 70 attached to the axle 12 at the other end thereof, with a rearwardly extending bent section 72 (FIG. 3) secured at its distal end to the spring mounting bracket 60. The track bar 24 serves to provide a high lateral suspension rate to thus reduce deflection steer and vehicle shake.

The optional anti-sway bar 26 (FIGS. 1-3), as an additional anti-roll device for particular vehicle applications, includes a main transverse section 74 with oppositely disposed bent ends 76 extending forwardly. An anti-sway bar link 78 (FIG. 3) is pivotally connected between the forward end of each bent end 76 and a bracket 80 on the respective side rail 22.

Figure 10:
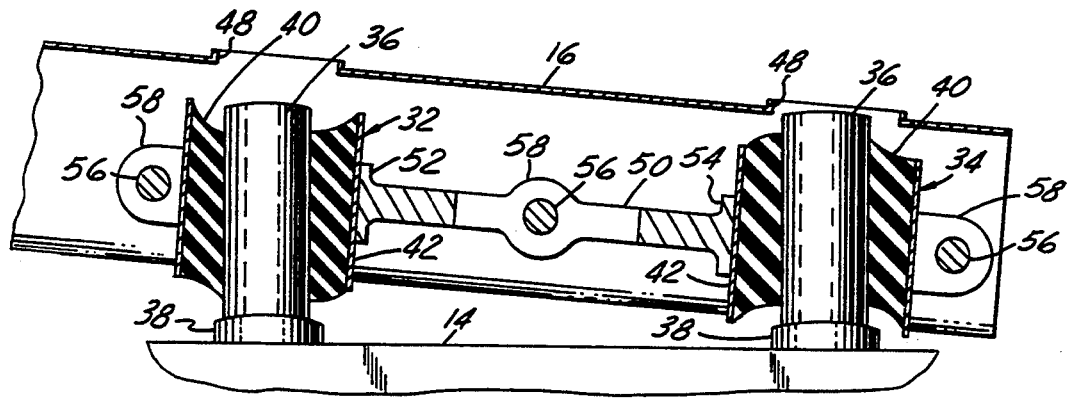
Figure 11:
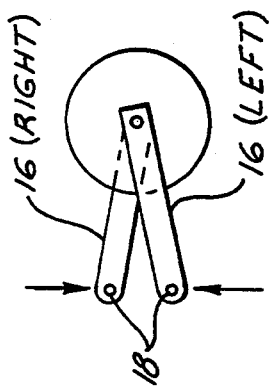
FIG. 11 is a schematic view of an operational condition of the invention.

Referring now to FIGS. 9 and 10 there is illustrated the operational characteristics occurring during a vehicle body roll in a right turn situation, during jounce (FIG. 9) and rebound (FIG. 10). As previously described, the inner metal sleeves 36 are secured to the axle 12 via the respective wheel support members 14, and the outer metal sleeves 34 are secured to the respective trailing arms 16 by the straps 50 and bolts 56. As such, during the right turn, it is apparent that the right side trailing arm 16 pivot connection 18 is raised and the left side connection 18 is lowered (FIG. 11), with the respective intermediate bonded rubber rings 40 (FIG. 9 and 10) being deflected to thereby cause energy to be stored in the rubber which serves to urge the system to return to its normal condition. This action results in equal and opposite forces on the two trailing arm 16 pivot connections 18, as indicated in FIG. 11. The bushings 32 and 34 can be designed to provide the desired resistance to body roll.

Figure 12:
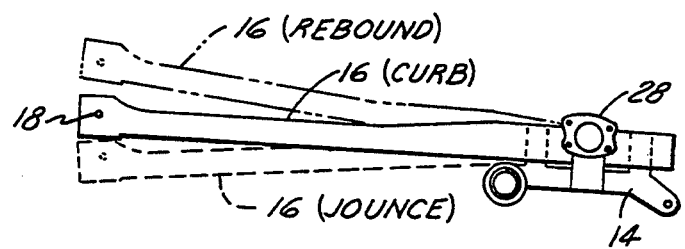
FIG. 12 is a view of a portion of the FIG. 2 structure illustrating a further operational condition of the invention.

FIG. 12 illustrates the jounce and rebound positions of a particular arm 16 relative to curb position.

INDUSTRIAL APPLICABILITY

It should be apparent that the invention provides an efficient rear suspension system wherein a pair of trailing arms are operatively connected between the side rails and the tubular axle via wheel support members, with vertically oriented resilient bushings connected between respective wheel support members and trailing arms to urge the latter back to their normal conditions during roll conditions. The front pivotal connection is in series with the rear dual bushings, providing a suspension rate which improves the ride characteristics and reduces road noise transmission.

It should be further apparent that the invention provides a rear suspension system which is ideal for packaging in a low flat vehicle floor.

While but one embodiment of the invention has been shown and described, other modifications are possible within the scope of the following claims.

What is claimed is:

1. For use on a vehicle chassis including side rails and a tubular axle having wheel support members on the ends thereof, a vehicle rear suspension system comprising a pair of trailing arms each having one end thereof pivotally connected to a respective side rail, and a pair of resilient bushings having parallel axes and operatively connected between each wheel support member and the other end of each trailing arm for urging said one end of each trailing arm into its normal condition during roll conditions.

2. The rear suspension system described in claim 1, wherein said pivotally connected one end and said pair of resilient bushings are in series.

3. The rear suspension system described in claim 1, wherein said pair of resilient bushings each include an inner metal sleeve secured to one of each said wheel support member and each said trailing arm, an outer metal sleeve secured to the other of one of each said trailing arm and each said wheel support member, and a rubber ring bonded intermediate each inner and outer sleeve.

4. The rear suspension system described in claim 1, wherein said pair of resilient bushings each include an inner metal sleeve secured to each said wheel support member, an outer metal sleeve secured to said other end of each said trailing arm, and a rubber ring bonded intermediate each inner and outer sleeve.

5. The rear suspension system described in claim 4, and comprising a bushing support member secured between the outer metal sleeves and the trailing arm.

6. The rear suspension system described in claim 4, and comprising a bolt extended through each inner metal sleeve to threadedly secure each said inner metal sleeve to said wheel support member.

7. The rear suspension system described in claim 1, wherein it is the forward end of each trailing arm which is pivotally connected to each said side rail.

8. The rear suspension system described in claim 3, wherein said bonded rubber ring is deflected during roll serving to store energy therein to urge said pivoted end of each trailing arm to return to its normal condition.

9. The rear suspension system described in claim 1, and a lateral restraint track bar extending across the vehicle chassis at a predetermined angle with respect to said tubular axle, between one side rail at one end and the axle at the other end.

10. The rear suspension system described in claim 1, wherein said parallel axes are substantially vertically oriented.

* * * * *